(12) United States Patent
Persson et al.

(10) Patent No.: US 6,587,500 B1
(45) Date of Patent: Jul. 1, 2003

(54) SYMBOL SAMPLING TIME SETTLEMENT OF A HARD DECISION RADIO RECEIVER

(75) Inventors: Joakim Persson, Lund (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/453,485

(22) Filed: Dec. 17, 1999

(51) Int. Cl.⁷ .............................................. H04L 27/30
(52) U.S. Cl. ...................... 375/142; 375/150; 375/355; 375/367; 370/512; 370/515
(58) Field of Search .................... 375/142, 143, 375/150, 52, 343, 355, 367; 370/509, 510, 512, 514, 515

(56) References Cited

U.S. PATENT DOCUMENTS

| | | | | |
|---|---|---|---|---|
| 5,255,292 A | | 10/1993 | LaRosa et al. ............... | 375/116 |
| 5,263,050 A | * | 11/1993 | Sutterlin et al. ............. | 375/142 |
| 5,479,451 A | | 12/1995 | Eldering et al. ............ | 375/343 |
| 5,533,047 A | * | 7/1996 | Mourot et al. ............... | 370/479 |
| 5,642,377 A | * | 6/1997 | Chung et al. ................ | 375/145 |
| 5,761,211 A | | 6/1998 | Yamaguchi et al. ......... | 371/5.4 |
| 6,075,809 A | * | 6/2000 | Naruse ........................ | 375/147 |
| 6,266,365 B1 | * | 7/2001 | Wang et al. ................. | 370/342 |

FOREIGN PATENT DOCUMENTS

| | | | |
|---|---|---|---|
| DE | 196 38 412 A1 | 4/1998 | |
| GB | 2 206 267 A | 12/1988 | |
| JP | 59169244 A | 3/1983 | |
| JP | 60016041 A | 7/1983 | |
| JP | 08111677 | 10/1994 | ............. H04L/7/08 |
| JP | 8331114 | 5/1995 | ............. H04L/7/08 |

OTHER PUBLICATIONS

Standard Search Report for RS 104401 completed on Aug. 30, 2000, dated Sep. 4, 2000 EPX.

* cited by examiner

Primary Examiner—Stephen Chin
Assistant Examiner—Dac V. Ha
(74) Attorney, Agent, or Firm—Jenkens & Gilchrist, P.C.

(57) ABSTRACT

A method and apparatus for improving bit error performance within a hard decision radio interface processing environment is provided, whereby a sampling unit collects a number of samples per channel symbol of an input signal to generate a number of sampling streams, and a correlator computes a correlation value of each of the number of sampling streams with a predetermined bit sequence. The correlation values are fed into a threshold comparator which utilizes a variable threshold value to generate threshold comparator values or trigger output values. By examining a set of trigger output values, a phase decision unit determines the optimum sampling timing or sampling phase.

26 Claims, 4 Drawing Sheets

| $X_k$ | Phase decision | |
|---|---|---|
| - - - 0 | No decision is made | |
| 0001 | $\phi_{k-3}$ | |
| 0011 | $\phi_{k-3'}$ | $s_{k-4} \geq s_{k-1'}$ |
|  | $\phi_{k-2'}$ | $s_{k-4} < s_{k-1'}$ |
| 0101 | $\phi_{k-2}$ | |
| 0111 | $\phi_{k-2}$ | |
| 1001 | $\phi_{k-2}$ | |
| 1011 | $\phi_{k-2}$ | |
| 1101 | $\phi_{k-1}$ | |
| 1111 | $\phi_{k-2}$ | |

SYMBOL SAMPLING TIME SETTLEMENT OF A HARD DECISION RADIO RECEIVER

TECHNICAL FIELD OF THE INVENTION

The present invention relates in general to the telecommunications field and, in particular, to a method and apparatus for improving bit error performance within a hard decision radio interface processing environment.

BACKGROUND OF THE INVENTION

Economic feasibility of wireless links between portable devices and their associated accessories require implementation of low-power, low-cost equipment. Many existing portable devices use infrared links to meet this requirement. Although infrared transceivers are inexpensive, they have limited range, are sensitive to direction, and can generally only be used between two devices. By contrast, radio transceivers have a much greater range, can propagate around objects and connect to many devices simultaneously.

Many radio transceivers use hard decision type radio receivers. A radio receiver is said to use hard decisions when the size of the channel alphabet (i.e., the number of possible signals that can be transmitted) equals the size of the demodulator output alphabet (i.e., the number of possible output signals from the radio demodulator).

For instance, the Bluetooth system uses a binary signal alphabet for which the channel symbol duration time is $T=10^{-6}$ seconds (sec). The output of a radio receiver implementation for that system might be discrete in amplitude, but continuous in time. Consequently, a switch between the two possible amplitudes can take place at any instant of time. As such, the Bluetooth receiver is a hard decision receiver.

In general, the baseband processing in any binary digital communication system requires a bit stream rate of $1/T$ bits/sec. Therefore, the output of the time continuous demodulator needs to be converted to a discrete time sequence. However, a significant design problem is to determine the correct sampling time or phase of the discrete time sequence. Baseband processing performance for each module in a Bluetooth system depends on how well a receiver can attain an accurate timing synchronization with the transmitter of the information sequence. An inferior timing synchronization will severely degrade the bit error rate (BER) performance of a receiver within a Bluetooth system. Additionally, to avoid the loss of information at the beginning of the information bit stream which will further degrade the BER performance of the receiver, an accurate timing synchronization needs to be attained within a relatively short period of time.

Referring to FIG. 1, an eye-diagram 50 of a received signal is plotted to illustrate the problem of choosing a correct sampling time or phase within a hard decision radio interface processing environment. The eye-diagram 50 represents a time before the hard decisions have been performed (in order to clarify the issue). As illustrated, all points above zero represent a "+1", while all points below zero represent a "−1". The horizontal axis 51 represents the duration of one channel symbol and the four vertical bars 52–55 represent four possible sampling phases. Clearly, in this example, the best phase to choose is the second sampling phase 53 since it more or less is positioned in the middle of the eye opening. If the first sampling phase 52 or third sampling phase 54 is chosen, the result would be a decreased tolerance to noise and timing shifts between transmitter and receiver. Obviously, the fourth sampling phase 55 is a bad choice and should be avoided.

Referring to FIG. 2, each channel within a Bluetooth system is divided into 625 microsecond intervals or slots 30. One packet 34 of information can be transmitted per slot 30. Each packet 34 includes an access code 31, a header 32 and a payload 33. The access code 31 can be used for packet identification, synchronization and compensation for offsets.

FIG. 3 illustrates a radio 70 and correlator 74 which can be used for timing synchronization within a Bluetooth system. In this example, there are four possible phase values that should be checked, thus, the following discussion is in terms of establishing and comparing four phase samplings. Timing synchronization is accomplished by oversampling the demodulator output four times, i.e., $f=1/T_s=4/T$, where f is the sampling frequency and $T_s$ is the sampling time. Subsequently, the oversampled binary sequence is correlated with a known access code which precedes the actual data. Generally, the known access code is also a binary sequence. For soft decision type receivers, the correct phase choice would be the phase that generates a maximum correlation with the known binary sequence. Unfortunately, hard decision type receivers make the task of finding the correct sampling phase more difficult than if a soft decision would have been available. Given hard values, there is potentially more than one phase that results in maximum correlation. Additional details of the sample selection process are described below.

The blocks 75 depicted in FIG. 3 represent memory elements in a shift register 72. For each phase sample, the contents of the shift register 72 is shifted one step to the right. Thus, the shift register 72 contains four sampling sequences of the received bit stream. An additional register 71 contains the known sequence with which the four sampling sequences are correlated. A correlation value or correlator output 76 is determined by the correlator 74 for each sample and compared with a threshold value by means of a threshold comparator 77. The threshold comparator 77 can be part of the correlator 74 or a separate process or device.

In a straight-forward implementation, the correlator output exceeds a predetermined threshold value, the timing is assumed to be correct and the phase of the sample values that caused the correlator trigger is used as a reference for the sampling time of the remaining part of the packet 34 (FIG. 2). Generally this approach works because the access code words are carefully chosen in a way that ensures good autocorrelation results. In other words, for all reasonable threshold values, the correlator output is unlikely to trigger unless the entire access code is within the correlator window. Thus, the phase that generates the first trigger output (binary representation of an indication that the correlator output 76 exceeds the preset threshold value) is chosen, unless a better value is found within a few sampling intervals. However, this type of phase decision within a hard decision radio interface processing environment is not optimal because the chosen phase value may be closer to the beginning of the eye rather than in the middle of the eye (FIG. 1). An erroneous choice of a sampling phase causes a receiver to be more sensitive to thermal noise and other interference from radio sources in the used frequency band. Consequently, an erroneous choice leads to degraded BER performance.

The Bluetooth system is only one example of a wireless system which uses a hard decision radio interface processing environment. The present invention relates to all digital radio interface processing environments which use hard decision decoding.

SUMMARY OF THE INVENTION

In accordance with a preferred embodiment of the present invention, a method and apparatus for improving bit error performance within a hard decision radio interface processing environment is provided, whereby a sampling unit samples an input signal to generate a sampling stream, and a correlator computes the correlation between the generated sample stream and a predetermined bit sequence. The correlation values are fed into a threshold comparator utilizing a variable threshold, and a phase decision unit determines the optimum sampling phase from the resultant threshold comparator values.

An important technical advantage of the present invention is that a method and apparatus for improving bit error performance within a hard decision radio interface processing environment is provided, whereby baseband processing of the receiver attains accurate timing synchronization with the transmission of the information sequence.

Another important technical advantage of the present invention is that a method and system for improving bit error performance within a hard decision radio interface processing environment is provided, whereby the required signal-to-noise ratio of the receiver is reduced.

Another important technical advantage of the present invention is that a method and apparatus is provided which adapts to a better channel by updating the comparator threshold value and thereby decreasing the probability of a false alarm.

Still another important technical advantage of the present invention is that the behavior of the receiver can be modified by changing the contents of a phase decision table.

BRIEF DESCRIPTION OF THE DRAWINGS

A more complete understanding of the method and system of the present invention will be had by reference to the following detailed description when taken in conjunction with the accompanying drawings wherein.

DETAILED DESCRIPTION OF THE INVENTION

The present invention will now be described more fully hereinafter with reference to the accompanying drawings, like numerals being used for like and corresponding parts of the various drawings.

Essentially, in accordance with a preferred embodiment of the present invention, a method and apparatus for improving bit error performance within a hard decision radio interface processing environment is provided, whereby a sampling unit collects a number of samples per channel symbol of an input signal to generate a number of sampling streams, and a correlator computes a correlation value of each of the number of sampling streams with a predetermined bit sequence. The correlation values are fed into a threshold comparator which utilizes a variable threshold value to generate threshold comparator values or trigger output values. By examining a set of trigger output values, a phase decision unit determines the optimum sampling timing or sampling phase.

Figures 4, 5:
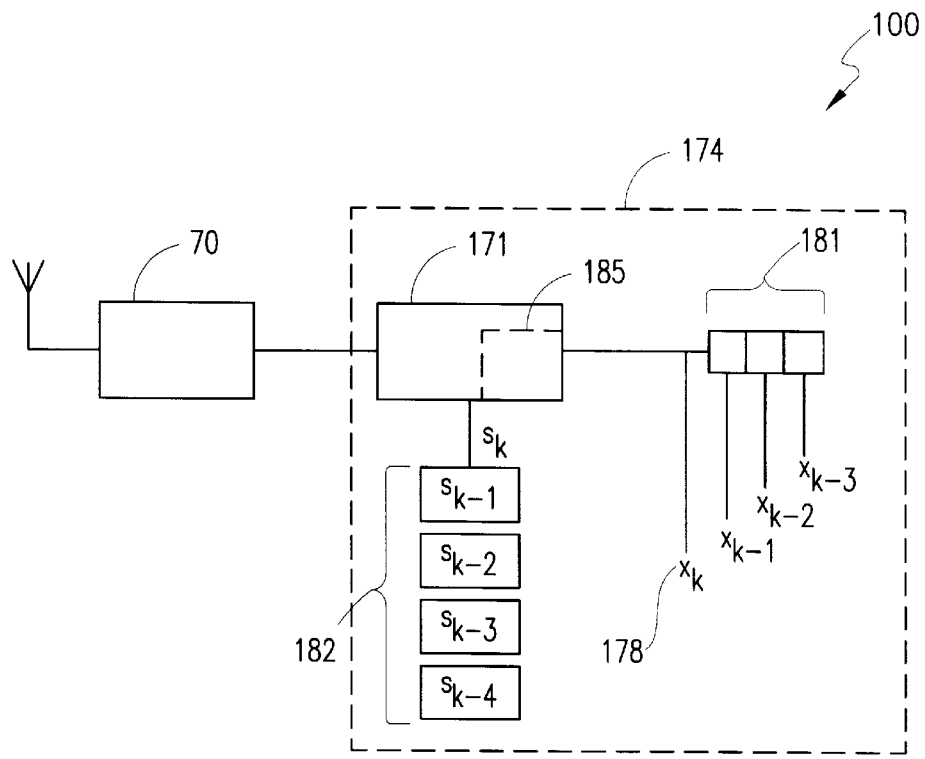
FIG. 4 is a block diagram of a modified time synchronization circuit which can be implemented in accordance with a preferred embodiment of the present invention.
FIG. 5 is a table of exemplary phase decision rules which can be implemented in accordance with a preferred embodiment of the present invention.

Reference is now made to FIG. 4 which shows a block diagram of a modified time synchronization circuit 100 which can be implemented in accordance with a preferred embodiment of the present invention. For this exemplary embodiment, unit 100 includes a memory 181 comprising three cells. Each cell can store one trigger output value 178 (discussed below). In other embodiments in which the number of samples per channel symbol is greater than four, the number of cells in the memory is set equal to the number of samples per channel symbol minus one. Also, these memory cells are adaptable and can be reset.

For the preferred embodiment, only time instants t which are some multiple k of the sampling time, $T_s$, are considered (i.e., $t=kT_s$). For each time instant t, the correlation between the shift register 72 and register 71 is computed. The correlation value is denoted $s_k=s(kT_s)$ The correlation value $s_k$ is coupled to the threshold comparator 177 which compares the correlation value with a variable threshold value $y_k$.

The output of the threshold comparator 177 (trigger output value 178) is a binary representation defined by the following equation:

$$x_k = \begin{cases} 0 & s_k < y_k, \\ 1 & \text{otherwise.} \end{cases} \quad (1)$$

The threshold value $y_k$ can initially be set to any desired value. In the preferred embodiment, a default threshold value, denoted $\hat{y}$, is set to $y_0=\hat{y}$. Then, for $k \geq 0$, the threshold value $y_k$ can be updated according to the following equation:

$$y_{k+1} = \begin{cases} s_k, & s_k > y_k, \\ \hat{y}, & \text{decision on phase is made,} \\ y_k, & \text{otherwise.} \end{cases} \quad (2)$$

Consequently, in accordance with equation 2, if a current correlation value $s_k$ exceeds the threshold value $y_k$, the threshold value $y_{k+1}$ is updated to the value of the current correlation value $s_k$, and the subsequent correlation value is compared to the updated threshold value $y_{k+1}$. Furthermore, if a phase decision is to be made, the threshold is reset to the default threshold value $\hat{y}$. Otherwise, the threshold value remains unchanged for the subsequent comparison. As such, in order to make optimum phase decisions, a plurality of correlation values can be stored in memory 182 (described below).

Sequential trigger output values are grouped together to define a trigger output state $X_k$. Assume that $x_0=x_{-1}=x_{-2}=x_{-3}=0$. Then, at time instant k, the trigger output state $X_k$ is defined by the following equation:

$$X_k = \begin{cases} [1, 0, 0, 0], & s_k > y_k, \\ [x_k, x_{k-1}, x_{k-2}, x_{k-3}], & \text{otherwise.} \end{cases} \quad (3)$$

In accordance with equation 3, in most cases the trigger output state $X_k$ is the current trigger output $x_k$ combined with the three previous trigger outputs and if the correlator output exceeds the current threshold, the three trigger output memory cells 181 are reset. Initially, $X_0=[0,0,0,0]$ for the preferred embodiment.

Based on the trigger output state $X_k$, a decision on phase selection is made by means of a phase decision unit 185. The phase decision unit 185 can be implemented using hardware or software either separately or locally in the comparator 174. For the preferred embodiment, the phase value at sample k, denoted $\phi_k$, is defined as $$\phi_k = k \bmod 4. \tag{4}$$

Reference is now made to FIG. 5 which shows a table of phase decision rules 90 which can be implemented in accordance with a preferred embodiment of the present invention. As shown by the phase decision table 90, the phase decision unit 185 executes no phase decision if the trigger output value corresponding to position $x_{k-3}$ in the trigger output state $X_k$ is equal to "0", irrespective of the values in the other positions.

For a trigger output state $X_k$ corresponding to [0,0,1,1], the phase decision unit 185 also determines if the corresponding correlation value $s_{k-4}$ is less than the corresponding correlation value $s_{k-1}$ (both of which are stored in memory 182). The phase value of $\phi_{k-2}$ is chosen if the correlation value $s_{k-4}$ is less than the correlation value $s_{k-1}$, otherwise the phase value $\phi_{k-3}$ is chosen. A phase decision of $\phi_{k-3}$ is also made for a trigger output state $X_k$ corresponding to [0,0,0,1].

In addition, for trigger output states $X_k$ corresponding to [0,1,0,1], [0,1,1,1], [1,0,0,1], [1,0,1,1] and [1,1,1,1], a phase decision of $\phi_{k-2}$ is made. Finally, for a trigger output state $X_k$ corresponding to [1,1,0,1], a phase decision of $\phi_{k-1}$ is made. After the phase decision is made, the threshold value $y_k$ is set to the default value $\hat{y}$.

Figure 1:
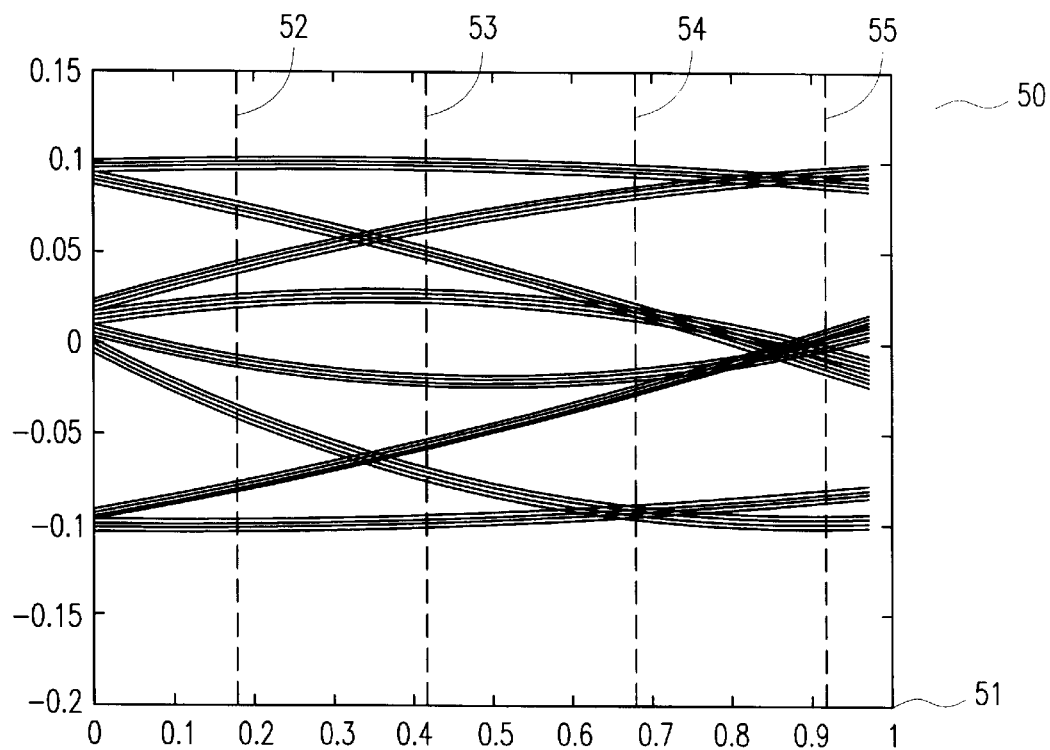
FIG. 1 is an eye diagram of a radio receiver output before making a hard decision.
Figure 2:
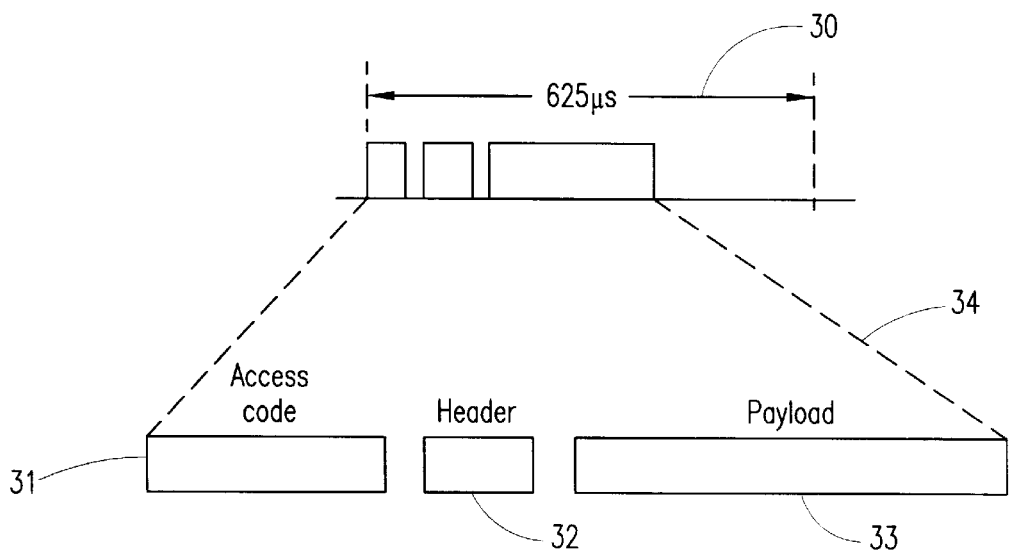
FIG. 2 is a block diagram of a Bluetooth packet illustrating an access code structure.
Figure 3:
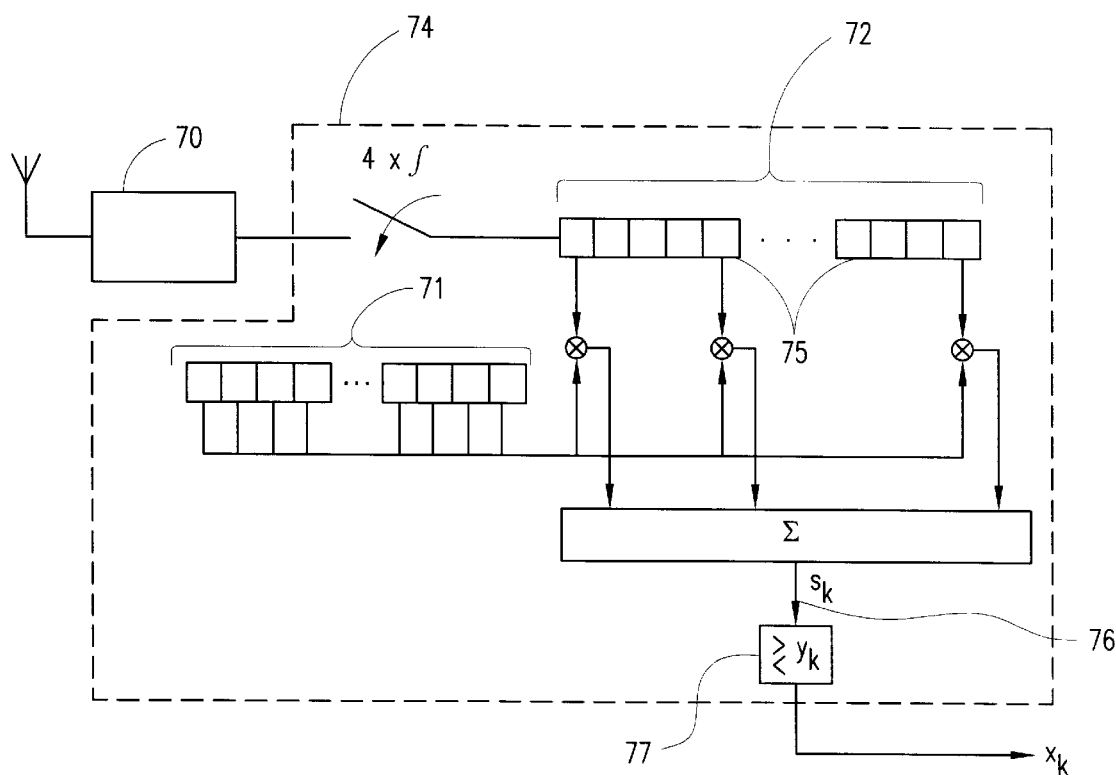
FIG. 3 is a block diagram illustrating a time synchronization circuit.
Figure 6:
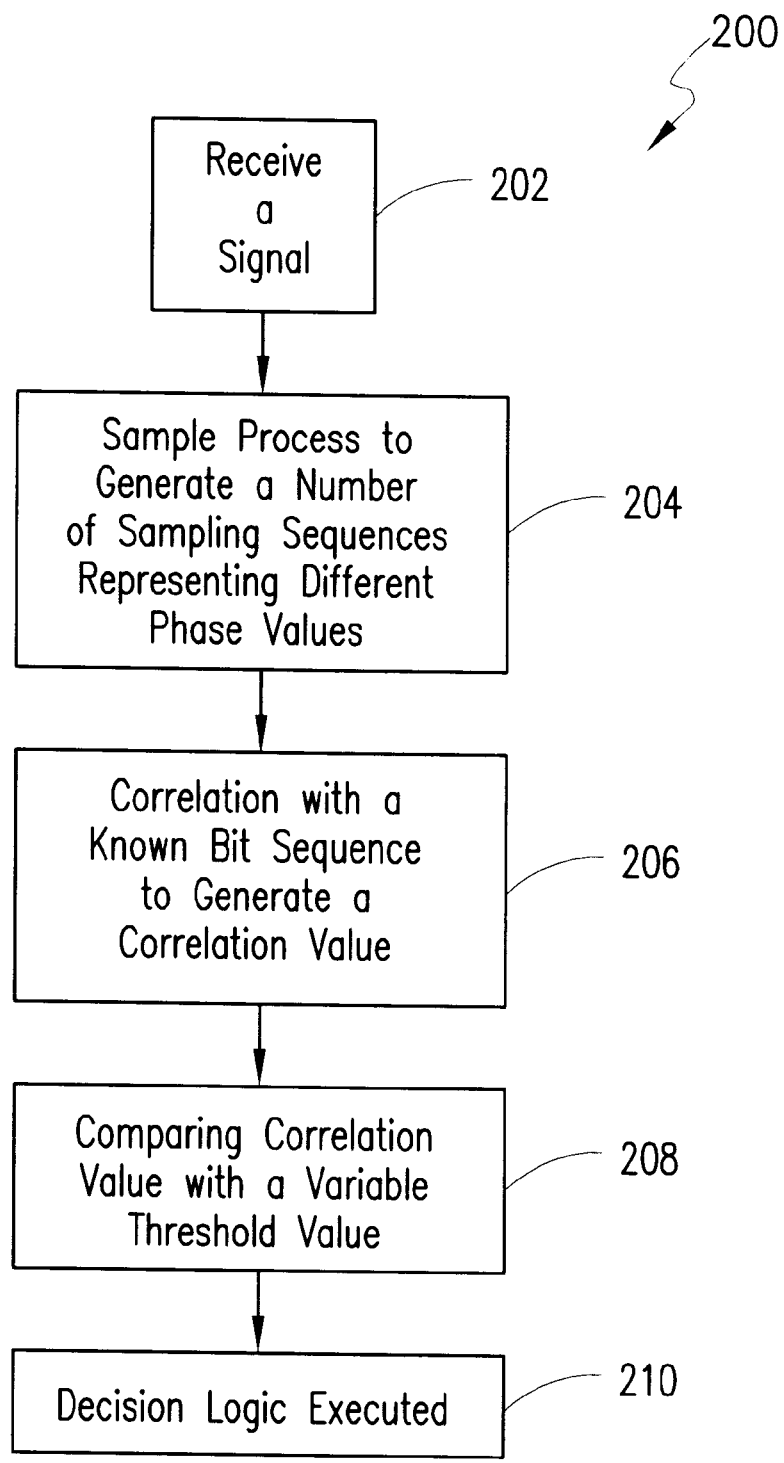
FIG. 6 is a flowchart illustrating a method that can be implemented in accordance with the present invention.

Reference is now made to FIG. 6 which illustrates a method 200 for implementing the preferred embodiment of the present invention. At step 202, a packet type signal is received. At step 204, part of the access code 31 (FIG. 2) or synchronization sequence is sampled a predetermined number of times per channel symbol to generate a corresponding number of sampling sequences with each representing a different phase value. For the preferred embodiment, each channel symbol is sampled four times. At step 206, each of the generated sampling sequences is correlated with a reference sequence to generate a respective correlation value for each of the sampling sequences. At step 208, the respective correlation values are compared with the threshold value $y_k$ to generate respective threshold comparator values or trigger output values $x_k$. For the preferred embodiment, the trigger output values $x_k$ are binary values.

The threshold value $y_k$ can be updated prior to each successive comparison with a subsequent correlation value. More specifically, if a current correlation value $s_k$ exceeds the threshold value $y_k$, the threshold value $y_{k+1}$ is updated to the value of the current correlation value $s_k$, and the subsequent correlation value is compared to the updated threshold value $y_{k+1}$. Also, if a phase decision is made, the threshold value is set to a predefined value. Otherwise, the threshold value remains unchanged for the subsequent comparison. At step 210, a phase decision is made based on a trigger output state $X_k$. The trigger output state $X_k$ is compared with a predetermined set of decision rules to select a sampling phase that agrees with the trigger output state $X_k$ and the determined set of decision rules.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for improving bit error performance within a hard decision radio interface processing environment, comprising the steps of:
   sampling a received signal including a plurality of channel symbols a predetermined number of times;
   generating a corresponding plurality of sampling sequences, each said sampling sequence representing a phase value;
   correlating each said sampling sequence with a reference sequence;
   generating a correlation value for each said sampling sequence;
   comparing each said respective correlation value with a threshold value;
   generating a plurality of binary trigger output values;
   generating a trigger output state from a grouped plurality of said plurality of binary trigger output values; and
   determining a sampling phase by comparing said trigger output state with predetermined decision rules.

2. The method according to claim 1 further including updating said threshold value for each said respective correlation value which exceeds said threshold value.

3. The method according to claim 1, wherein said received signal is sampled at least four times per said channel symbol.

4. The method according to claim 1 further including setting said threshold value to a default value in response to said determining a sampling phase.

5. The method according to claim 1, wherein said phase value is approximately equal to a multiple corresponding to said sampling sequence multiplied by mod 4.

6. The method according to claim 1 further including setting said threshold value equal to a current correlation value if said current correlation value is greater than said threshold value.

7. The method according to claim 1, wherein each said binary trigger output value is defined by zero when a corresponding correlation value is less than said threshold value and otherwise is defined by one.

8. The method according to claim 7, wherein said step of generating a trigger output state comprises generating a trigger output state defined by:

$$X_k = \begin{cases} [1, 0, \ldots, 0], & s_k > y_k, \\ [x_k, x_{k-1,\ldots}, x_{k-N+1}], & \text{otherwise,} \end{cases}$$

wherein said received signal is sampled N times per said channel symbol, $s_k$ represents said correlation value, $y_k$ represents said threshold value, and $x_k, \ldots, x_{k-N+1}$ represent said respective binary trigger output values.

9. The method according to claim 8, wherein said determining selects no sampling phase when said binary trigger output value corresponding to said position $x_{k-N+1}$ within said trigger output state is defined by binary zero.

10. The method according to claim 9, wherein said determining selects said sampling phase corresponding to said position $x_{k-N+1}$ for said trigger output state defined by [0, . . . ,0,1].

11. The method according to claim 10, wherein said determining selects said sampling phase corresponding to said position $x_{k-N+2}$ for said trigger output state defined by [0, . . . ,1,1] where correlation value $s_{k-N}$ is less than correlation value $s_{k-N+3}$, otherwise said determining selects said sampling phase corresponding to said position $x_{k-N+1}$.

12. The method according to claim 11, wherein said determining selects said sampling phase corresponding to said position $x_{k-N+2}$ for said trigger output state defined by at least one of $[0, \ldots, 1,0,1]$, $[0, \ldots, 1,1,1]$, $[0, \ldots, 1,0,0,1]$ and $[0, \ldots, 1,0,1,1]$.

13. The method according to claim 12, wherein said determining selects said sampling phase corresponding to said position $x_{k-N+3}$ for said trigger output state defined by $[0, \ldots, 1,1,0,1]$.

14. The method according to claim 13, wherein said determining selects said sampling phase corresponding to said position $x_{k-N+2}$ for said trigger output state defined by $[0, \ldots, 1,1,1,1]$.

15. An apparatus for improving bit error performance within a hard decision radio interface processing environment, comprising:

means for sampling a received signal and generating a plurality of sampling sequences, each said sampling sequence representing a phase, a correlator coupled to said means for sampling, for correlating each said sampling sequence with a reference sequence and outputting a correlation value;

a comparator coupled to said correlator, for comparing each said output correlation value with a threshold value and generating a binary trigger output value for each said correlation value;

means for generating a trigger output state from a grouped plurality of said binary trigger output values; and a decision unit coupled to said comparator, for determining a sampling phase by comparing said trigger output state with predetermined decision rules.

16. The apparatus according to claim 15, wherein said threshold value is updated each time said respective correlation value exceeds said threshold value.

17. The apparatus according to claim 16, wherein said threshold value is updated to the value of said respective correlation value which exceeds said threshold value.

18. The apparatus according to claim 17, wherein said threshold value is updated to a default value in response to said decision unit determining said sampling phase.

19. The apparatus according to claim 15, wherein said binary trigger output value is defined by zero when a corresponding correlation value is less than said threshold value and otherwise is defined by one.

20. The apparatus according to claim 15, wherein said means for generating a trigger output state comprises means for generating a trigger output state defined by:

$$\chi_k = \begin{cases} [1, 0, \ldots, 0], & s_k > y_k, \\ [x_k, x_{k-1}, \ldots, x_{k-N+1}], & \text{otherwise,} \end{cases}$$

wherein said received signal is sampled N times per said channel symbol, $x_k, \ldots, x_{k-N+1}$ represents said respective binary trigger output values, $s_k$ represents said respective correlation value, and $y_k$ represents said threshold value.

21. The apparatus according to claim 20, wherein said decision unit determines no sampling phase when said binary trigger output value corresponding to said position $x_{k-N+1}$ within said trigger output state is defined by zero.

22. The apparatus according to claim 21, wherein said decision unit determining said sampling phase corresponding to said position $x_{k-N+1}$ for said trigger output state defined by $[0, \ldots, 0,1]$.

23. The apparatus according to claim 22, wherein said decision unit determining said sampling phase corresponding to said position $x_{k-N+1}$ for said trigger output state defined by $[0, \ldots, 1,1]$ where correlation value $s_{k-N}$ is less than correlation value $s_{k-N+3}$, otherwise said determining selects said sampling phase corresponding to said position $x_{k-N+1}$.

24. The apparatus according to claim 23, wherein said decision unit determining said sampling phase corresponding to said position $x_{k-N+2}$ for said trigger output state defined by at least one of $[0, \ldots, 1,0,1]$, $[0, \ldots, 1,1,1]$, $[0, \ldots, 1,0,0,1]$ and $[0, \ldots, 1,0,1,1]$.

25. The apparatus according to claim 24, wherein said decision unit determining said sampling phase corresponding to said position $x_{k-N+3}$ for said trigger output state defined by $[0, \ldots, 1,1,0,1]$.

26. The apparatus according to claim 25, wherein said decision unit determining said sampling phase corresponding to said position $x_{k-N+2}$ for said trigger output state defined by $[0, \ldots, 1,1,1,1]$.

* * * * *

UNITED STATES PATENT AND TRADEMARK OFFICE
CERTIFICATE OF CORRECTION

PATENT NO. : 6,587,500 B1
DATED : July 1, 2003
INVENTOR(S) : Persson et al.

It is certified that error appears in the above-identified patent and that said Letters Patent is hereby corrected as shown below:

Column 7,
Line 19, replace "a phase," with -- a phase; --

Column 8,
Line 24, replace "position $x_{k-N+1}$" with -- position $x_{k-N+2}$ --

Signed and Sealed this

Eighteenth Day of November, 2003

JAMES E. ROGAN
*Director of the United States Patent and Trademark Office*